3,024,266
AN IMPROVED PROCESS FOR THE NITRILATION OF 6-HALOHEXANOIC ACID ESTERS
Benjamin T. Freure and Harry J. Decker, Charleston, W. Va., assignors to Union Carbide Corporation, a corporation of New York
No Drawing. Filed Sept. 24, 1958, Ser. No. 762,918
6 Claims. (Cl. 260—464)

This invention relates to an improved process for the production of esters of 7-aminoheptanoic acid. It is a continuation-in-part of application Serial No. 682,274, filed September 6, 1957, now abandoned.

The large scale preparation of 7-aminoheptanoic acid or its esters has hitherto presented difficulties, although many processes have been proposed. Among the previously proposed processes may be mentioned the reaction of epsilon-iodoamyl benzamide or epsilon-iodoamyl phthalimide with the sodium derivative of diethyl malonate followed by hydrolysis of the resulting product with a strong mineral acid. 6-bromohexanoic acid has been used to prepare salts of 6-cyanohexanoic acid, which were then hydrogenated to obtain the corresponding salt of the 7-amino acid in low yield. 1-aminoheptanoic acid has also been prepared by reaction of epsilon-caprolactam with dimethyl sulfate; from suberone and hydroxylamine in the presence of sulfuric acid; and by partial hydrogenation of pimelonitrile followed by alkaline hydrolysis and neutralization. However, none of the above methods for the production of 7-aminoheptanoic acid have been practical for large scale production practices.

It has now been found that esters of 7-aminoheptanoic acid can be produced by commercially feasible methods in high yields and at economical costs and in satisfactory purity for producing the polymerizates thereof by means of the process herein described. In carrying out the process of this invention a 6-halohexanoic acid is esterified and then nitrilated with an alkali metal cyanide or alkaline earth metal cyanide in the presence of a liquid polar organic solvent, which is inert under the nitrilation conditions employed, to produce the ester of 6-cyanohexanoic acid. Subsequently the cyano group is reduced to yield the 7-aminoheptanoate ester. The preferred cyanides are the alkali metal cyanides.

The advantages of the present process over the known methods are achieved by the use of certain inert organic polar solvents as the reaction medium in the nitrilation step. Results when using certain organic polar solvents were unexpectedly superior to those in which other solvents were used, even when bromo-substituted starting materials were used, as in the prior art. The bromo compounds are usually regarded as more reactive than chloro compounds in the nitrilation reaction, and higher yields are usually obtained with their use than with chloro compounds.

The inert organic polar solvents suitable for use in the present invention are those polar solvents which contain a sulfur atom which is doubly bonded to an oxygen atom. These compounds are the dialkyl compounds represented by the general formula:

R—X—R wherein R represents an alkyl radical containing 1 or 2 carbon atoms and X represents an

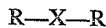

or

radical. Such compounds are the alkyl sulfoxides as represented by the general formula:

and the alkyl sulfones as represented by the formula:

Illustrative compounds are dimethyl sulfoxide, diethyl sulfoxide, ethyl methyl sulfoxide, dimethyl sulfone, diethyl sulfone and ethyl methyl sulfone.

The esterification of the 6-halohexanoic acid, wherein the halogen atom may be fluorine, chlorine, bromine or iodine, can be carried out by any of the conventional procedures; for example, by heating a mixture of the alcohol and halo acid in the presence of an acid such as sulfuric acid, and removing the water as it is formed. Suitable alcohols for use in the esterification reaction are the linear and branched aliphatic alcohols, the cycloaliphatic alcohols and the aralkyl alcohols, which may be represented by the empirical formula: ROH, wherein R represents a hydrocarbon radical. Illustrative of the alcohols which may be used are methanol, ethanol, isopropanol, n-propanol, n-butanol, n-octanol, 2-ethylbutanol, pentanol, 2-ethylhexanol, cyclohexanol, 1-phenylethanol, 2-phenylethanol, and the like. The esters produced by the esterification may be represented by the empirical formula: $X(CH_2)_5COOR$, wherein X represents a halogen atom and R represents a hydrocarbon radical, for example, ethyl 6-chlorohexanoate, butyl 6-chlorohexanoate, cyclohexyl 6-chlorohexanoate, 2-ethylbutyl 6-chlorohexanoate, 1-phenylethyl 6-chlorohexanoate, propyl 6-bromohexanoate, and the like.

The nitrilation of the 6-halohexanoic acid esters is carried out in an organic polar solvent using an alkali metal cyanide or an alkaline earth metal cyanide, for example, the alkali metal cyanides of lithium, sodium, potassium, rubidium and cesium, and the alkaline earth metal cyanides of strontium and barium. The nitrilation reaction medium is preferably kept slightly alkaline since these sulfur-containing polar solvents are unstable under acid conditions, and give rise to sulfur compounds which poison the hydrogenation catalysts and inhibit hydrogenation to the amine.

The nitrilation can be carried out at temperatures of from about 70° C. to about 150° C., with 120° C. to about 140° C. preferred. In practice, the lowest limit is the lowest temperature at which reaction will take place, and the maximum temperature that can be used is dictated by the decomposition point of the solvent and of the reactants. The amount of inert organic polar solvent present is not a critical factor, and may be varied over a wide range. The reaction mixture can initially contain from 35 to 95% by weight of said solvent; however, we prefer to use about equal parts by weight of solvent and ester.

The mole ratio of inorganic cyanide salt to 6-halohexanoic acid ester is not critical, and may be varied from about 1:1 to as high a ratio as practicable. Of course, reaction will take place at lower mole ratios, but the conversion will be reduced; while at higher mole ratios no commensurate advantage is observed and one is then faced with the problem of disposing of or recovering the excess unreacted cyanide. The reaction time will vary inversely with temperature; the higher the temperature the shorter the time required. In general, thirty minutes to about four hours covers the practical limits, with one to two hours at from 120° C. to about 140° C. preferred, even though the reaction time is not critical.

The reduction of the 6-cyanohexanoic acid ester may be carried out by any of the conventional hydrogenation processes known in the art without any of the difficulties heretofore encountered. The problems encountered in the prior art resulted in the necessity for using special grades of Raney nickel, or Raney cobalt catalysts for the hydrogenation, which had to be performed at pressures of about 1000 p.s.i.g. or higher. Since 7-aminoheptanoic acid cannot be distilled and is exceedingly difficult to purify by recrystallization, processes designed to produce the free acid were hampered by the difficulty of attaining the isoelectric point of the acid necessary for its proper precipitation. However, by the processes of this invention all of the prior difficulties have been avoided. For example, ethyl 6-cyanohexanoate was successfully reduced in isopropanol solution using commercially available Raney nickel catalyst at a hydrogenation pressure of about 150 p.s.i.g. In the hydrogenation of the nitrile, a small amount of anhydrous ammonia, about 1 mole per mole of cyano ester, can be added to inhibit secondry amine formation. Ordinarily, about 10 percent ammonia by weight based on the weight of cyano ester charged is sufficient, though larger amounts may be used. The 7-aminoheptanoate esters prepared by the process of this invention can be recovered by conventional distillation technique using high vacuum and short exposure to heat to reduce undesirable resin formation.

Other hydrogenation catalysts may also be used, as for example, palladium on carbon, platinum on carbon or Raney cobalt. The catalyst may be separated from the reduction mixture by decantation and re-used in additional hydrogenations until it has lost its activity.

The 6-cyanohexanoate esters are usually obtained in pure enough form after the nitrilation step so that they may be hydrogenated without distilling. Among the cyano esters which can be used in the reduction step there may be mentioned ethyl 6-cyanohexanoate, isopropyl 6-cyanohexanoate, butyl 6-cyanohexanoate, cyclohexyl 6-cyanohexanoate, 2-ethylbutyl 6-cyanohexanoate, 1-phenylethyl 6-cyanohexanoate, octyl 6-cyanohexanoate, and the like.

The following examples further serve to illustrate this invention. Parts are by weight unless otherwise specified.

*Example 1*

Fifty-four parts of hydrogen cyanide was fed to an agitated slurry of 85 parts of 95 percent sodium hydroxide in 356 parts of dimethyl sulfoxide. The reaction resulting in the formation of sodium cyanide is highly exothermic, and the reaction temperature is controlled so as not to rise above about 95° C. during the hydrogen cyanide addition. After the reaction of the hydrogen cyanide with the sodium hydroxide was completed, a vacuum was applied to the reaction flask, and the water of reaction was removed at reduced pressure. The resulting solution of sodium cyanide in dimethyl sulfoxide was then heated to 95° C. to 100° C., and 356 parts of ethyl 6-chlorohexanoate was introduced at this temperature over a period of 30 minutes. This reaction is also exothermic, and the reaction temperature was self-sustained after the addition of about 60 parts of the ethyl 6-chlorohexanoate. The temperature was maintained at 95° C. to 100° C. for 30 minutes after all of the chloro ester had been added to insure complete reaction. The reaction mixture was filtered and a filter cake of sodium chloride containing 0.9 percent unreacted sodium cyanide was recovered. On fractional distillation of the filtrate there was obtained 340 parts of dimethyl sulfoxide distilling at 65° C. to 70° C. at 6 mm. Hg pressure, 15 parts of unreacted ethyl 6-chlorohexanoate distilling at 62° C. to 78° C. at 1 mm. Hg pressure and 305 parts of ethyl 6-cyanohexanoate distilling at 96° C. to 99° C. at 1 mm. Hg pressure, which had a purity of 97 percent. Yield of ethyl 6-cyanohexanoate was 90 percent based on the ethyl 6-chlorohexanoate used.

*Example 2*

There were charged 274 parts of dimethyl sulfoxide, 274 parts of ethyl 6-chlorohexanoate and 113 parts of sodium cyanide to a reaction flask equipped with a stirrer and a reflux condenser. The mixture was slowly heated and at 80° C. an exothermic reaction set in causing the temperature to rise rapidly to 155° C. Water cooling was applied to cool the reaction mixture to 125° C. and maintain it below 125° C. until the exothermic reaction expired. The mixture was then stirred at 80° C. for two hours, cooled to room temperature and filtered to remove the sodium chloride produced during the nitrilation. The filter cake was washed with dimethyl sulfoxide and the combined filtrate and washings were vacuum distilled as described in Example 1. The ethyl 6-cyanohexanoate produced was of 97.6 percent purity and weighed 223 parts; yield was 84 percent based on the ethyl 6-chlorohexanoate used.

*Example 3*

A mixture of 109 parts of sodium cyanide and 349 parts of dimethyl sulfone was charged to a reaction flask and heated to 145 to 150° C. to melt the sulfone and disperse the cyanide uniformly through it. There was then fed to this mixture 357 parts of ethyl 6-chlorohexanoate over a period of 45 minutes, at a temperature of 145° C. The mixture was held at this temperature an additional 30 minutes to complete the reaction, after which it was filtered while still hot to remove the precipitated sodium chloride. The filter cake was washed with hot ethylbenzene, and filtrate and washings were combined and washed with hot water to remove the sulfone. Distillation then afforded a 73 percent yield of cyano ester at 85 percent efficiency.

*Example 4*

Ethyl methyl sulfoxide was produced by reacting at 30° C. 200 parts of ethyl methyl sulfide dissolved in 400 parts of acetic acid with 297 parts of 30% hydrogen peroxide. The ethyl methyl sulfoxide boiled at 78° to 80° C. at 10 mm. Hg pressure; other properties were $d^{30}_{15.6}$, 1.045 and $n^{30}_{D}$, 1.4713

One hundred and nine parts of the above-prepared ethyl methyl sulfoxide and 33 parts of sodium cyanide were charged to a reaction flask and heated with stirring to 95° C. to dissolve the sodium cyanide. There was fed to this mixture 109 parts of ethyl 6-chlorohexanoate over a 10 minute period, and then the mixture was stirred at 110° to 115° C. for an additional two hours to complete the reaction. The reaction mixture was filtered to remove insoluble inorganic salts and distilled whereby there was recovered 94 parts of ethyl 6-cyanohexanoate in 91% yield.

What is claimed is:

1. In the production of esters of 6-cyanohexanoic acid and an alcohol selected from the group consisting of aliphatic alcohols, cycloaliphatic alcohols, and aralkyl alcohols of the formula ROH wherein R is a hydrocarbon radical which comprises the nitrilation of the corresponding esters of 6-halohexanoic acid at from about 70° C. to about 150° C. with a member selected from the group consisting of alkali metal cyanides and alkaline earth metal cyanides, the improvement of carrying out the nitrilation step in an inert polar solvent selected from the group represented by the general formula:

R—X—R wherein R represents a member selected from the group consisting of methyl and ethyl radicals and X represents a member selected from the group consisting of an

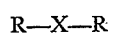

and

radical.

2. A process as claimed in claim 1, wherein the inert polar solvent is a dialkyl sulfoxide represented by the general formula:

wherein R has the same meanings as claimed in claim 1.

3. A process as claimed in claim 1, wherein the inert polar solvent is a dialkyl sulfone represented by the general formula:

wherein R has the same meanings as claimed in claim 1.

4. A process as claimed in claim 1, wherein the inert polar solvent is dimethyl sulfoxide.

5. A process as claimed in claim 1, wherein the inert polar solvent is dimethyl sulfone.

6. A process as claimed in claim 1, wherein the inert polar solvent is ethyl methyl sulfoxide.

References Cited in the file of this patent

UNITED STATES PATENTS

| | | |
|---|---|---|
| 2,365,898 | Morris et al. | Dec. 26, 1944 |
| 2,605,285 | Schultz | July 29, 1952 |
| 2,812,324 | Huber et al. | Nov. 5, 1957 |